(12) United States Patent
Miron et al.

(10) Patent No.: US 12,634,324 B2
(45) Date of Patent: May 19, 2026

(54) SYSTEM AND METHOD FOR TRAINING A GENERATIVE ADVERSARIAL MODEL IN A CYBERSECURITY RANGE

(71) Applicant: Cympire Ltd., Raanana (IL)

(72) Inventors: Itay Miron, Petach Tikva (IL); Yaniv Shachar, Tel Aviv (IL)

(73) Assignee: Cympire, Raanana (IL)

( * ) Notice: Subject to any disclaimer, the term of this patent is extended or adjusted under 35 U.S.C. 154(b) by 100 days.

(21) Appl. No.: 18/441,780

(22) Filed: Feb. 14, 2024

(65) Prior Publication Data

US 2025/0260708 A1 Aug. 14, 2025

(51) Int. Cl.
  *H04L 9/40* (2022.01)
(52) U.S. Cl.
  CPC ................................. *H04L 63/1433* (2013.01)
(58) Field of Classification Search
  CPC .. G06N 20/00; G06N 3/0475; G06F 16/3329;
      G06F 40/30; H04L 63/1433; H04L 41/16
  USPC .......................................................... 726/25
  See application file for complete search history.

(56) References Cited

U.S. PATENT DOCUMENTS

| | | | |
|---|---|---|---|
| 9,824,609 B2 | 11/2017 | Sadeh-Koniecpol et al. | |
| 2018/0288087 A1* | 10/2018 | Hittel | H04L 63/145 |
| 2022/0005373 A1 | 1/2022 | Nelson et al. | |
| 2022/0070222 A1* | 3/2022 | Rao | H04L 63/101 |
| 2025/0068667 A1* | 2/2025 | Blum | G06F 16/345 |
| 2025/0173436 A1* | 5/2025 | Zhang | G06F 21/56 |
| 2025/0190763 A1* | 6/2025 | Banuelos | G06N 3/0455 |
| 2025/0200293 A1* | 6/2025 | Liu | G06F 40/35 |
| 2025/0209208 A1* | 6/2025 | Vaknin | G06F 40/30 |

* cited by examiner

*Primary Examiner* — Meng Vang
(74) *Attorney, Agent, or Firm* — M&B IP Analysts, LLC

(57) ABSTRACT

A system and method for utilizing a generative adversarial model for training in a cybersecurity range is presented. The method includes: generating a plurality of scenarios based on a plurality of predetermined actions in a cloud computing environment; initiating a cybersecurity range, the cybersecurity range including a secure cloud computing environment and a plurality of workloads deployed therein; generating a prompt for a large language model (LLM) based on a template, a scenario of the plurality of scenarios, and an identifier of a workload of the plurality of workloads; and initiating an action in the cybersecurity range based on an output generated by the LLM in response to the prompt.

19 Claims, 8 Drawing Sheets

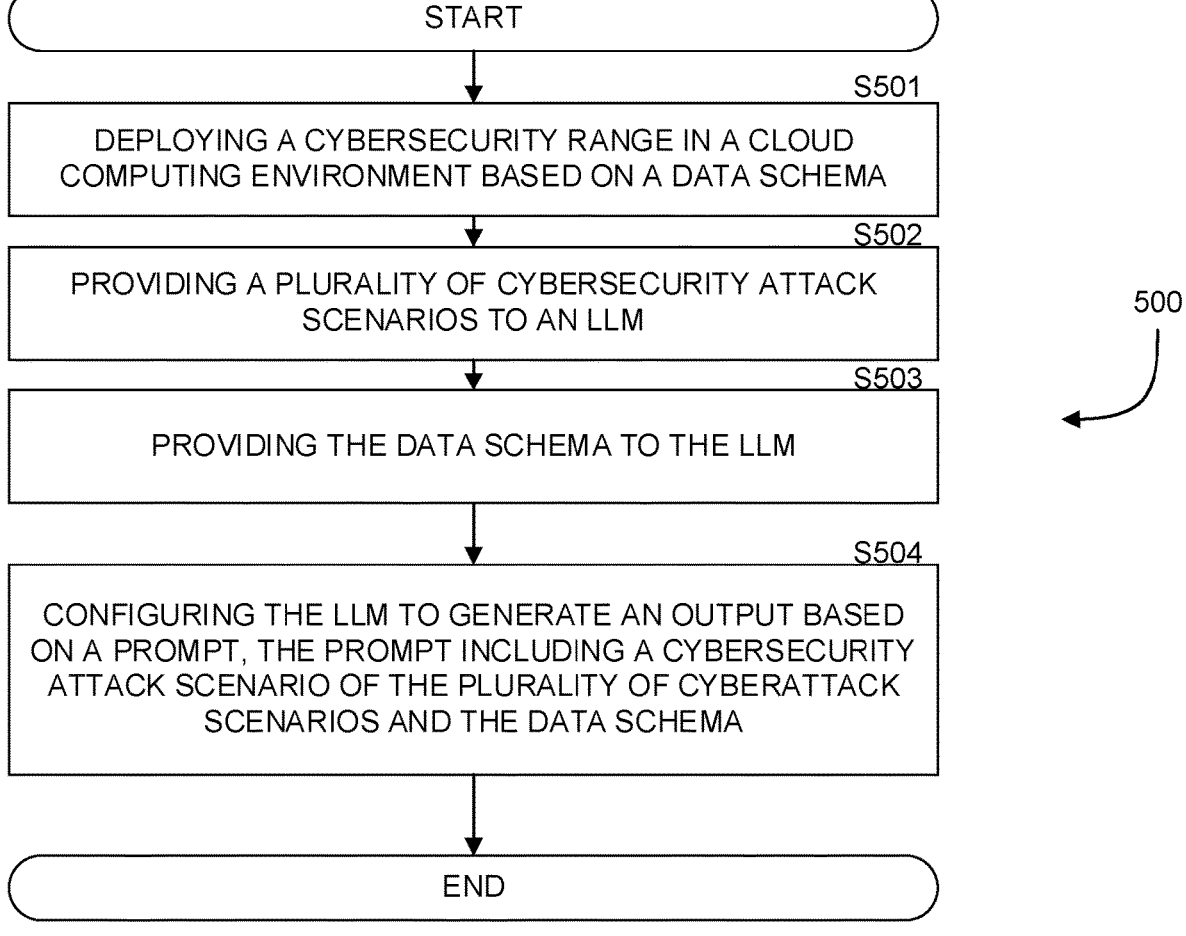

START

S501

DEPLOYING A CYBERSECURITY RANGE IN A CLOUD
COMPUTING ENVIRONMENT BASED ON A DATA SCHEMA

S502

PROVIDING A PLURALITY OF CYBERSECURITY ATTACK
SCENARIOS TO AN LLM

S503

PROVIDING THE DATA SCHEMA TO THE LLM

S504

CONFIGURING THE LLM TO GENERATE AN OUTPUT BASED
ON A PROMPT, THE PROMPT INCLUDING A CYBERSECURITY
ATTACK SCENARIO OF THE PLURALITY OF CYBERATTACK
SCENARIOS AND THE DATA SCHEMA

END

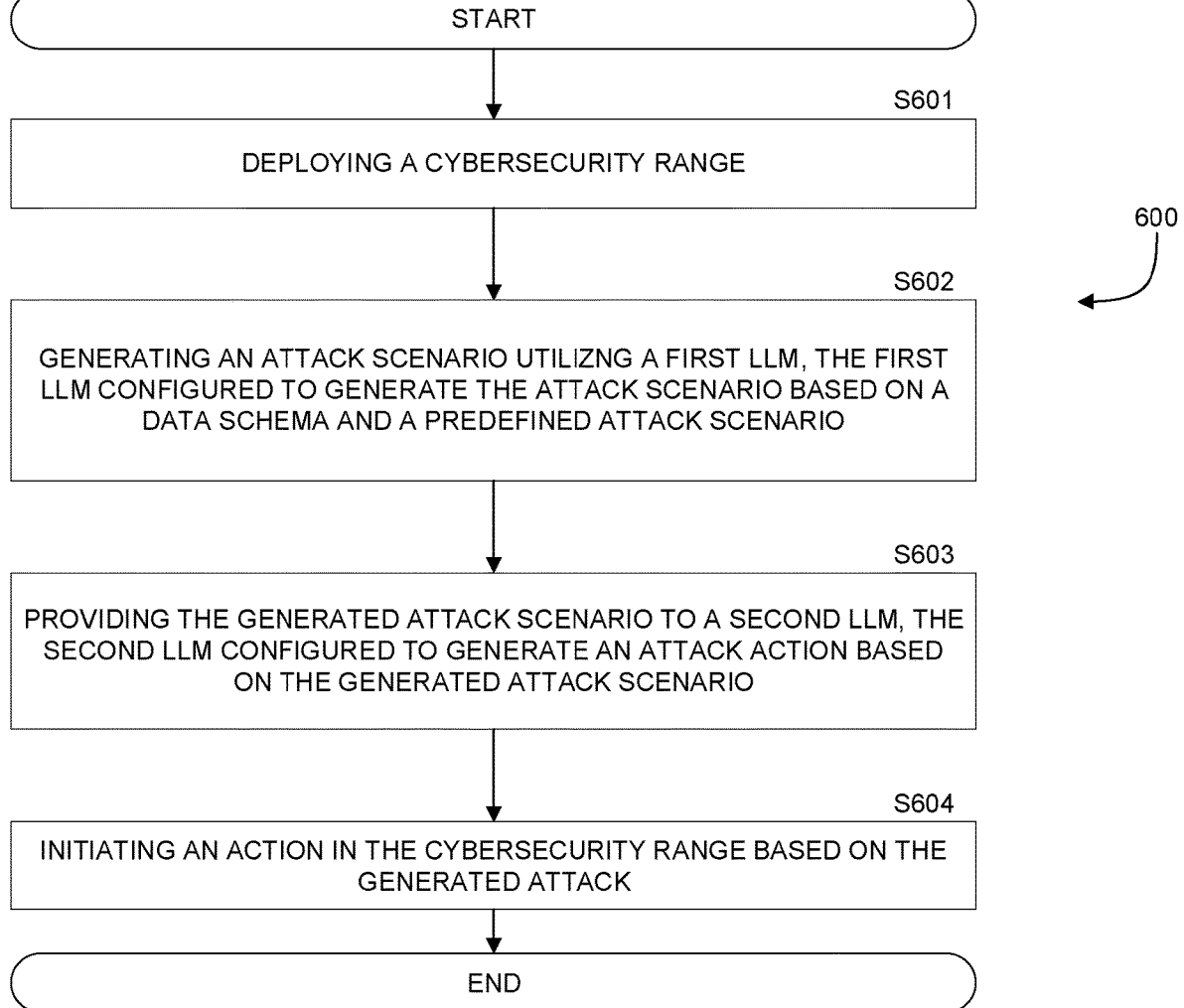

START

S601

DEPLOYING A CYBERSECURITY RANGE

600

S602

GENERATING AN ATTACK SCENARIO UTILIZNG A FIRST LLM, THE FIRST LLM CONFIGURED TO GENERATE THE ATTACK SCENARIO BASED ON A DATA SCHEMA AND A PREDEFINED ATTACK SCENARIO

S603

PROVIDING THE GENERATED ATTACK SCENARIO TO A SECOND LLM, THE SECOND LLM CONFIGURED TO GENERATE AN ATTACK ACTION BASED ON THE GENERATED ATTACK SCENARIO

S604

INITIATING AN ACTION IN THE CYBERSECURITY RANGE BASED ON THE GENERATED ATTACK

END

FIGURE 6

START

S701

DEPLOY A CYBERSECURITY RANGE BASED ON A DATA SCHEMA

S702

INITIATE ATTACK SCENARIO

700

S703

GENERATE A PROMPT BASED ON THE DATA SCHEMA AND THE ATTACK SCENARIO, WHICH WHEN EXECUTED BY THE BLUE ADVERSARIAL LLM CONFIGURES THE LLM TO GENERATE AN OUTPUT INCLUDING A DEFENSE ACTION

S704

INITIATE AN ACTION IN THE CYBERSECURITY RANGE BASED ON THE DEFENSE ACTION

END

SYSTEM AND METHOD FOR TRAINING A GENERATIVE ADVERSARIAL MODEL IN A CYBERSECURITY RANGE

TECHNICAL FIELD

The present disclosure relates generally to cybersecurity and specifically to the utilization of Artificial Intelligence, specifically a Large Language Model (LLM), to generate a plurality of cyber-incident scenarios for the purposes of utilizing cybersecurity ranges to simulate cyber attacks and train cyber incident response teams.

BACKGROUND

Cybersecurity is a field of technology which aims to protect, and prevent, computer systems from unwanted information disclosure, theft, damage, misdirection, disruption, and the like. However, despite the various technological solutions, one of the greatest flaws in computer systems is the human operator. Social engineering, misconfigurations, delays in updating systems known to contain security threats, all lead to cybersecurity issues which are a result of human error.

As in any field, a human operator is only as good as the training they receive. It is therefore beneficial to provide training facilities and resources to human operators, in order, for example, to measure their ability to respond to cybersecurity threats, to measure their ability to uncover and detect cybersecurity events, and to train them in order to improve their skill.

For this purpose, certain providers supply a cyber range, which provide a virtual environment in which cybersecurity threats are purposefully added to train human operators on how to respond to such threats. The virtual environments attempt to provide a realistic experience, and provide environments in which solutions can be tested without real-world repercussions.

While the environment is simulated, the threats are real, and so such environments must be contained and well defined. Any misconfiguration can potentially cause harm which ripples through the cloud environment, and possible to other cloud environments as well. On the other hand, such constraints make defining a range more difficult for a human operator, and more security constraints means less flexibility in how a range is deployed, and the amount of time it takes to deploy a range. It is useful to increase flexibility in order to train with different scenarios, and it is useful to decrease the amount of time it takes to deploy a range as this increases engagement with the range platform, which makes it more likely to be used by trainees.

It is advantageous to generate cyber ranges with multiple different scenarios, in order to practice different attack situations. However, planning such scenarios requires considerable preparation, due at least to some of the challenges noted above. While shortening this time would be advantageous, doing so quickly may lead to errors in the environment which would render the cyber range inoperable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a plurality of scenarios based on a plurality of predetermined actions in a cloud computing environment. Method may also include initiating a cybersecurity range, the cybersecurity range including a secure cloud computing environment and a plurality of workloads deployed therein. Method may furthermore include generating a prompt for a large language model (LLM) based on a template, a scenario of the plurality of scenarios, and an identifier of a workload of the plurality of workloads. Method may in addition include initiating an action in the cybersecurity range based on an output generated by the LLM in response to the prompt. Other embodiments of this aspect include corresponding computer systems, apparatus, and computer programs recorded on one or more computer storage devices, each configured to perform the actions of the methods.

Implementations may include one or more of the following features. Method may include: configuring a workload of the plurality of workloads with a vulnerability; and generating the prompt for the LLM further based on the vulnerability. Method may include: exploiting the vulnerability of the workload. Method may include: continuously generating prompts for the LLM; and continuously initiating actions in the cybersecurity range based on outputs generated by the LLM. Method may include: generating a prompt for the LLM based on a template, where the prompt causes the LLM to output an action for the cloud computing environment. Method may include: generating the prompt further based on an identifier of a principal, where the principal is deployed in the secure cloud computing environment. Method may include: configuring a workload of the plurality of workloads with an exposure; and generating the prompt further based on the exposure. Method may include: generating a network access instruction based on the exposure. Method where the exposure is between a first partition of the secure cloud computing environment and a second partition of the secure cloud computing environment. Implementations of the described techniques may include hardware, a method or process, or a computer tangible medium.

In one general aspect, non-transitory computer-readable medium may include one or more instructions that, when executed by one or more processors of a device, cause the device to: generate a plurality of scenarios based on a plurality of predetermined actions in a cloud computing environment. Medium may furthermore initiate a cybersecurity range, the cybersecurity range including a secure cloud computing environment and a plurality of workloads deployed therein. Medium may in addition generate a prompt for a large language model (LLM) based on a template, a scenario of the plurality of scenarios, and an identifier of a workload of the plurality of workloads. Medium may moreover initiate an action in the cybersecurity range based on an output generated by the LLM in response to the prompt. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: generate a plurality of scenarios based on a plurality of predetermined actions in a cloud computing environment. System may in addition initiate a cybersecurity range, the cybersecurity range including a secure cloud computing environment and a plurality of workloads deployed therein. System may moreover generate a prompt for a large language model (LLM) based on a template, a scenario of the plurality of scenarios, and an identifier of a workload of the plurality of workloads. System may also initiate an action in the cybersecurity range based on an output generated by the LLM in response to the prompt. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure a workload of the plurality of workloads with a vulnerability; and generate the prompt for the LLM further based on the vulnerability. System where the memory contains further instructions which when executed by the processing circuitry further configure the system to: exploit the vulnerability of the workload. System where the memory contains further instructions which when executed by the processing circuitry further configure the system to: continuously generate prompts for the LLM; and continuously initiate actions in the cybersecurity range based on outputs generated by the LLM. System where the memory contains further instructions which when executed by the processing circuitry further configure the system to: generate a prompt for the LLM based on a template, where the prompt causes the LLM to output an action for the cloud computing environment. System where the memory contains further instructions which when executed by the processing circuitry further configure the system to: generate the prompt further based on an identifier of a principal, where the principal is deployed in the secure cloud computing environment. System where the memory contains further instructions which when executed by the processing circuitry further configure the system to: configure a workload of the plurality of workloads with an exposure; and generate the prompt further based on the exposure. System where the memory contains further instructions which when executed by the processing circuitry further configure the system to: generate a network access instruction based on the exposure. System where the exposure is between a first partition of the secure cloud computing environment and a second partition of the secure cloud computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is an example flowchart of a method for training a red team generative adversarial model, implemented in accordance with an embodiment.

FIG. 6 is an example flowchart of a method for utilizing a red team generative adversarial model in a cybersecurity range, implemented in accordance with an embodiment.

DETAILED DESCRIPTION

Figure 1:
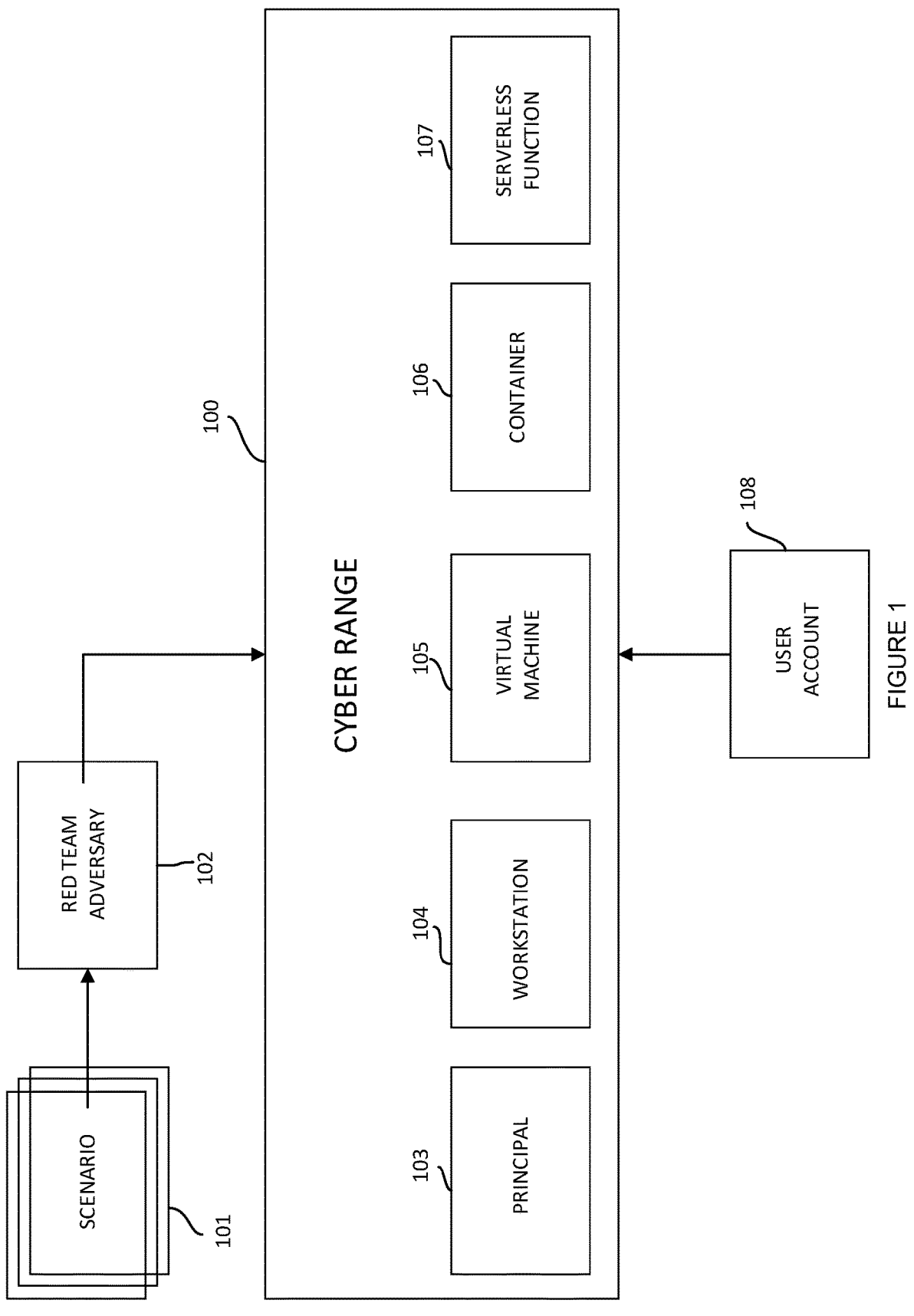
FIG. 1 is an example schematic diagram of a virtual cybersecurity range, including a red team generative adversarial model configured to attack an asset in the range, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for training a generative adversarial model in a cybersecurity range. In an embodiment, training a generative adversarial model in a cybersecurity range includes providing the generative model with one or more scenarios from a plurality of scenarios. In certain embodiments, a scenario constitutes a series of events, including steps to be taken to compromise (or respond to compromised) assets, intended to simulate a cyber event.

FIG. 1 is an example schematic diagram of a virtual cybersecurity range, including a red team generative adversarial model configured to attack an asset in the range, implemented in accordance with an embodiment.

According to an embodiment, a virtual cybersecurity range 100 is an isolated virtual space, such as a virtual private cloud (VPC), Virtual network (VNet), a combination thereof, and the like. In some embodiments, the cybersecurity range 100 is deployed on a cloud computing infrastructure.

In an embodiment, a cloud computing infrastructure is, for example, Amazon® Web Services (AWS), Google® Cloud Platform (GCP), Microsoft® Azure, and the like. A virtual range (also referred to as a cybersecurity range, range, virtual cybersecurity range, etc.) is established for cybersecurity testing and evaluation purposes, in an embodiment.

In certain embodiments, the cybersecurity range 100 includes a plurality of resources, principals, and the like. A resource is, for example, a virtual machine 105, a software container 106, a serverless function 107, a combination thereof, and the like. In an embodiment, a workstation 104 is a device which is configured to connect over a network to the cybersecurity range 100.

In an embodiment, a virtual machine 105 is implemented as an Oracle® VirtualBox®. In some embodiments, a software container 106 is implemented utilizing Kubernetes®, Docker®, and the like. In certain embodiments, a serverless function 107 is, for example, Amazon® Lambda.

In certain embodiments a workstation 104 is a personal computing device, such as a laptop, a tablet, a smartphone, a personal computer, various combinations thereof, and the like.

In an embodiment, a principal 103 is a cloud entity which is configured to initiate actions in the cybersecurity range 100. For example, a principal 103 is, according to an embodiment, a user account, a service account, a user role, a user group, a combination thereof, and the like.

In certain embodiments, a user account 108 is configured to access the cybersecurity range 100, for example to detect a cybersecurity attack thereon. In an embodiment, a red team adversary 102 is configured to initiate such an attack on, or in, the cybersecurity range 100.

According to some embodiments, a red team adversary 102 includes a trained generative adversarial model which is configured to generate and initiate an attack sequence.

In some embodiments, the generative adversarial model is trained utilizing a data set of attack scenarios such as a plurality of scenarios 101. In an embodiment, an adversarial model includes a generative artificial intelligence model trained utilizing supervised machine learning techniques.

Machine learning techniques used to train the generative adversarial model include supervised learning, unsupervised learning, semi-supervised learning, self-supervised learning, reinforcement learning, and the like, according to an embodiment. In some embodiments, the generative adversarial model includes a Large Language Model (LLM), a Generative Adversarial Network (GAN), a combination thereof, and the like.

Large Language Models (LLM) are a form of neural network configured to simulate general-purpose language understanding and generation. Some LLMs learn through computation of billions of parameters in an effort to develop future prediction capabilities based on a provided input, and to provide an output founded upon said prediction capabilities.

Generative Adversarial Networks (GANs) are a type of neural network setup. GANs learn through a process wherein two neural networks contest with each other in the form of a zero-sum game, according to an embodiment. A zero-sum game is a game wherein one player's gain is equal to the other player's loss. Thus, in an embodiment, the red team generative adversarial model 102 is configured to generate attack scenarios through enactment of scenarios and receiving input of responses to initiating such actions. In an embodiment, the responses are generated by a blue team generative adversarial model, discussed in more detail below.

According to an embodiment, a scenario of the plurality of scenarios 101 includes a series of events, instructions, actions, and the like, which when initiated in or on the cybersecurity range 100 generate an attack on the cybersecurity range 100. These events, instructions, actions, and the like, are also referred to herein as attack actions, attack vectors, and the like.

Figure 2:
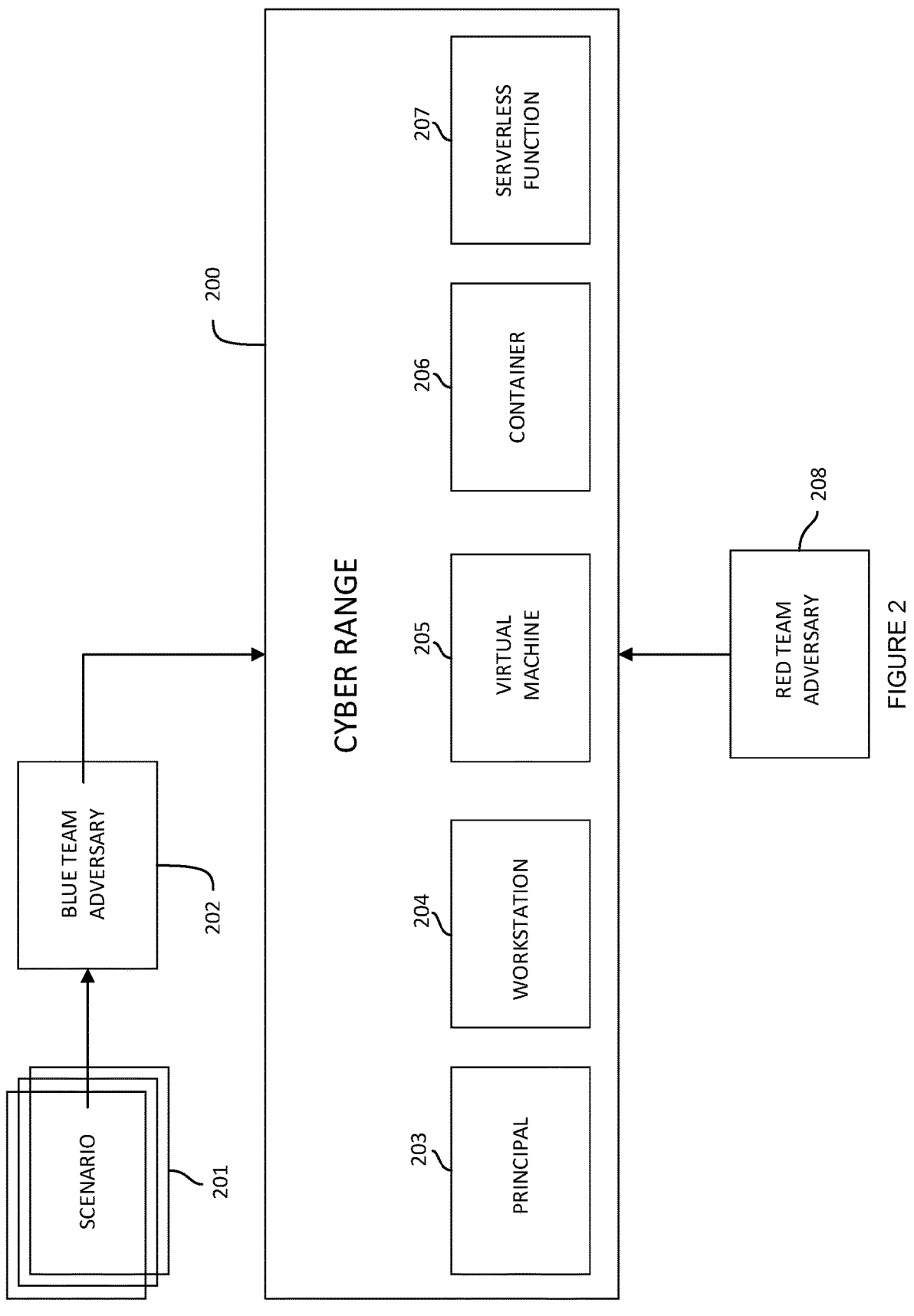
FIG. 2 is an example schematic diagram of a cybersecurity range including a blue team generative adversarial model, implemented in accordance with an embodiment.

FIG. 2 is an example schematic diagram of a cybersecurity range including a blue team generative adversarial model, implemented in accordance with an embodiment.

In an embodiment, a blue team generative adversary 202 includes an adversarial model. In an embodiment, adversarial model is trained utilizing a plurality of scenarios 201. In some embodiments, the plurality of scenarios 201 include a plurality of defensive events, scenarios, actions, a combination thereof, and the like.

For example, in an embodiment, the adversarial model is an LLM which is configured to generate an action based on a prompt, the prompt including a scenario of the plurality of scenarios 201.

In some embodiments, the adversarial model includes a generative adversarial network (GAN) which includes a generator model and a discriminator model. In an embodiment, the generator model is configured to generate an action, for example based on a scenario, a group of scenarios, etc. of the plurality of scenarios 201. In certain embodiments, the discriminator model is configured to detect a flaw in the output of the generator model. In such an embodiment, where the discriminator detects a flaw, that flaw is provided as a training input to the generator model, and another cycle of action generation is performed by the generator model.

In an embodiment, a red team adversary 208 is a user account configured to access the cybersecurity range 200. In some embodiments, the red team adversary 208 is the trained red team adversary 102 of FIG. 1 above. In an embodiment, the red team adversary 208 initiates an attack on or in the cybersecurity range 200.

According to an embodiment, the blue team adversary 202 is configured to detect events, actions, and the like, in the cybersecurity range 200. For example, in an embodiment, a serverless function 207 is configured to generate a network log, an event log, and the like, including data records of network communication, identity events (e.g., creating a new principal, changing permissions, roles, and the like of an existing principal, etc.), orchestration events, and the like.

In some embodiments, the blue team adversary 202 is configured to detect events, actions, and the like, in the cybersecurity range 200, and utilize such events as an input to a machine learning model (e.g., an LLM, a GAN, etc.) to generate a defense action. In some embodiments, the blue team adversary 202 is configured to generate the defense action further based on a scenario of the plurality of scenarios 201.

For example, in an embodiments, the blue team adversary 202 is configured to detect an event. In an embodiment, the blue team adversary 202 is configured to generate a match between the event and a scenario of the plurality of scenarios 201. In some embodiments, the blue team adversary 202 is further configured to generate a defense action based on the matched scenario and the event.

As an example, in an embodiment, the event is a detected change in permission of a first user to an admin role. In an embodiment, the event is matched to a scenario which indicates privilege escalation. In some embodiments, the blue team adversary 202 includes an LLM, and a prompt is generated for the LLM which configures the LLM to output a defense action in response to the prompt, which is based on the detected event and the selected scenario.

Figure 3:
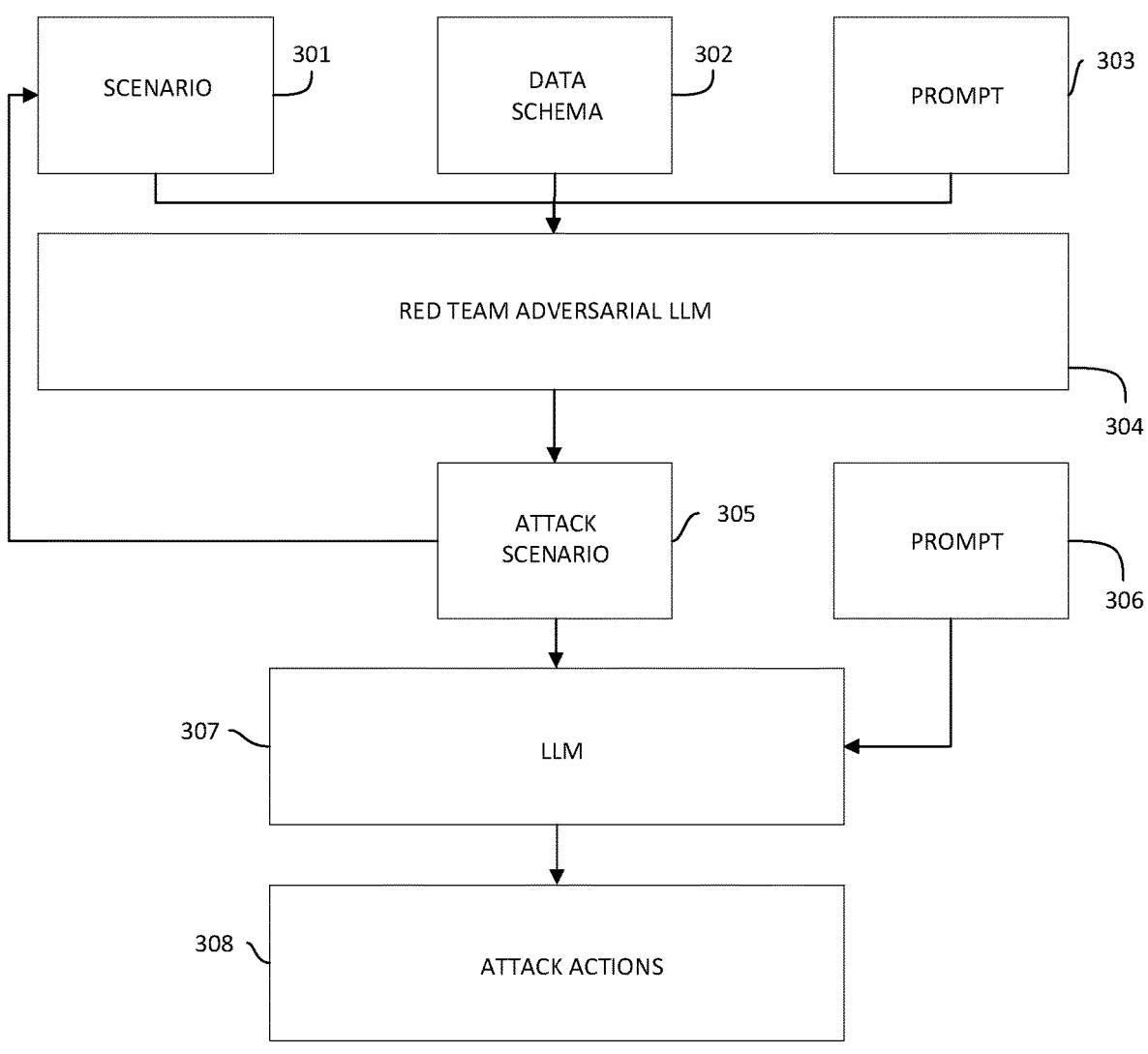
FIG. 3 is an example schematic diagram of a red team generative adversarial model, implemented according to an embodiment.

FIG. 3 is an example schematic diagram of a red team generative adversarial model, implemented according to an embodiment. In an embodiment, a generative adversarial model 304 is configured to receive an input including a scenario 301, a predefined data schema 302, and a prompt 303.

In an embodiment, the scenario 301 is selected from a plurality of attack scenarios, including for example, a misconfiguration exploitation, a privilege escalation, a vulnerability exploitation, a lateral movement, a combination thereof, and the like.

In some embodiments, a predefined data schema 302 includes a data schema of a cybersecurity range. According to an embodiment, a data schema 302 includes all known assets within a cybersecurity range. In an embodiment, the data schema 302 is implemented in the form of plaintext, markup language (for example, YAML), a combination thereof, and the like. In an embodiment, the data schema 302 includes a network topology of the cybersecurity range, a list of assets, a list of principals, various combinations thereof, and the like.

In an embodiment, a prompt 303 includes a prompt template. In some embodiments, the prompt template is modified based on the scenario 301 and the data schema 302. In certain embodiments, the prompt 303 includes a natural language prompt, a structured query language prompt, a combination thereof, and the like.

In some embodiments, the prompt 303, when executed by the red team adversarial LLM 304, configures the LLM 304 to generate an output which includes an attack scenario 305. In an embodiment, the attack scenario 305 includes an action 308 which when initiated in the cybersecurity range, initiates an attack on an asset, a resource, a principal, and the like, of the cybersecurity range.

In certain embodiments, the attack scenario 305 is added to a plurality of attack scenarios, which are utilized by the LLM 304 when generating new attack scenarios. For example, in an embodiment, the LLM 304 receives as an input a prompt 303, a data schema 302, and a plurality of scenarios 301, including a generated attack scenario, and is configured to generate, based on these inputs, a new attack scenario.

According to an embodiment, the generated attack scenario 305 is a scenario described in FIG. 1 above. In an embodiment, attack actions 308 are instructions which when executed in a computing environment, for example by a virtual instance (e.g., a serverless function), utilize an exposure, a misconfiguration, a vulnerability, and the like, to access a component of a computing environment which is secured.

For example, according to an embodiment, an attack action 308 includes: attempting to access an asset without authorization, attempting to exfiltrate data from a secure asset, attempting to hijack credentials of an administrator account and impersonate said account, attempting to "spin down" an asset within the cybersecurity range, a combination thereof, and the like.

Figure 4:
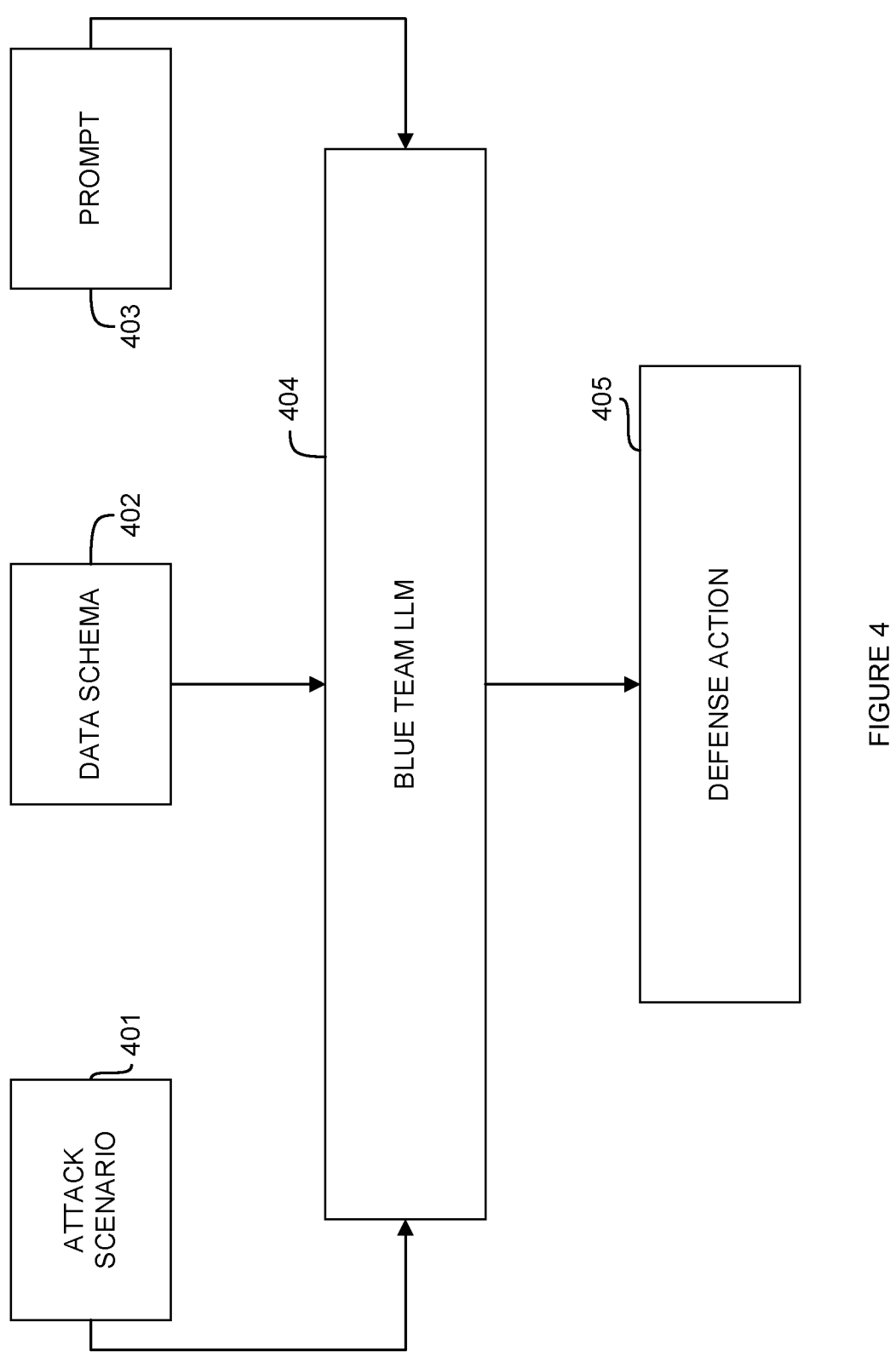
FIG. 4 is an example schematic diagram of utilizing a blue team generative adversarial model, implemented in accordance with an embodiment.

FIG. 4 is an example schematic diagram of utilizing a blue team generative adversarial model, implemented in accordance with an embodiment. In an embodiment, a blue team LLM 404 is configured to receive an input including an attack scenario, a data schema 402, and a prompt 403. In some embodiment, the LLM 404 is configured to output a defense action 405 for execution in a computing environment, such as a cybersecurity range.

According to an embodiment, the attack scenario 401 is generated by a red team generative adversarial model, such as described in more detail herein, and specifically with respect to FIG. 3 above.

In some embodiments, the attack scenario 401 includes a plurality of actions, instructions, and the like, for execution in a cybersecurity range, computing environment, cloud computing environment, combination thereof, and the like. In certain embodiments, an attack scenario 401 includes a statement, for example a natural language statement (e.g., 'attack exposed virtual machines').

In an embodiment, a data schema 402 includes a network hierarchy of a cybersecurity range, metadata related to the cybersecurity range, a list of resources, a list of principals, a combination thereof, and the like.

In some embodiments, the prompt 403 is generated based on a predefined template, and modified by an attack scenario 401, a data schema 402, a combination thereof, and the like. For example, in an embodiment, a virtual instance (such as a serverless function), is configured to generate a prompt 403 for ab LLM 404, based on a prompt template, the data schema 402 and an attack scenario 401.

In an embodiment, a defense action 405 includes an action, an instruction, and the like to secure an asset, plurality of assets, etc. that are deployed in a cybersecurity range. In certain embodiments, the defense action 405 includes initiating a remediation protocol, initiating a remediation policy, a combination thereof, and the like.

For example, in an embodiment, the defense action 405 includes: decommissioning a compromised asset, preventing exfiltration of data across a network, changing access credentials of a principal, suspending a compromised administrator account, initiating backup procedures to maintain data integrity, outbound packet analysis to monitor and track data transfer, a combination thereof, and the like.

In an embodiment, a defense action 405 includes a statement, for example 'secure all exposed virtual machines', 'prevent lateral movement', and the like. In some embodiments, a statement is provided to an LLM, such as the blue team LLM 404, which is configured to generate an instruction to implement the statement in a computing environment, such as the cybersecurity range.

In some embodiments, the LLM is configured to generate the instruction by executing a prompt, based on a modified predetermined prompt template, wherein the predetermined prompt template is modified based on a defense action statement, and the data schema 402.

FIG. 5 is an example flowchart 500 of a method for training a red team generative adversarial model, implemented in accordance with an embodiment. In an embodiment, a generative adversarial model includes a plurality of neural networks. In some embodiments, the generative adversarial model includes a generator model and a discriminator model. In an embodiment, the generator model is configured to generate attack actions, a sequence of attack actions, and the like.

In some embodiments, a discriminator model is configured to evaluate an attack action generated by the generator model. In an embodiment, evaluating an attack action includes executing the action in a computing environment (e.g., a cybersecurity range), and determining an outcome of that execution. In some embodiments, the outcome is provided to the generator model as a training data point.

At S501, a cybersecurity range is deployed. In an embodiment, the cybersecurity range is deployed in a cloud computing environment. In some embodiments, the cybersecurity range is deployed based on a data schema. For example, in an embodiment, a data schema includes a network topology, network hierarchy, list of resources, list of principals, a combination thereof, and the like.

In an embodiment, a cybersecurity range is a virtual range, for example as described in FIG. 1. According to an embodiment, a data schema is a representation of a cloud computing environment, including the various assets that are deployed within the computing environment.

In an embodiment, a data schema is expressed via data stored in, and retrievable from: a relational database, data collected within a file, a series of files, and the like, for example stored in a particular format (e.g., as markup language, such as YAML, or as character delimited data, such as in a Comma Separated Values format file), as items within in a document database (such as MongoDB), a combination thereof, and the like.

At S502, an LLM is provided with a prompt. In an embodiment, the prompt includes a plurality of cybersecurity attack scenarios. In some embodiments, a cybersecurity attack scenario includes an attack action (e.g., an instruction executable in a computing environment). In an embodiment, such as an orchestrator, a virtual instance, and the like, is configured to execute the instruction in the computing environment.

A plurality of attack scenarios includes, according to an embodiment, a first attack scenario, and a second attack scenario, wherein the second attack scenario is generated by an LLM, and the first attack scenario corresponds to a real attack scenario.

In some embodiments, a prompt is generated for the LLM based on a predetermined template, wherein the predetermined template is modified based on an attack action of an attack scenario. In some embodiments, the prompt is generated based on a plurality of attack scenarios.

At S503, a data schema is provided to the LLM. In an embodiment, a data schema includes a description of a computing environment (e.g., the cybersecurity range). In certain embodiments, the data schema includes a network topography, a network hierarchy, a list of resources, a list of principals, a combination thereof, and the like. In some embodiments, the data schema further includes an exposure, a vulnerability, a misconfiguration, a combination thereof, and the like.

For example, in an embodiment, the LLM is provided with a data schema and a prompt which configures the LLM to generate an attack instruction based on the data schema which attempts to exploit a misconfiguration of a resource detected in a network topology (e.g., access a load balancer that is not password protected).

At S504, an output is generated. In an embodiment, the LLM is configured to generate an output based on a provided prompt. According to an embodiment, the prompt provided to the LLM includes a cybersecurity attack scenario of the plurality of attack scenarios and the data schema.

In an embodiment, the output includes a generated attack scenario, wherein the attack scenario is comprised of a sequence of attack actions executed on objects (e.g., resources, principals, etc.) within the cybersecurity range environment.

In some embodiments, the output includes an attack statement (e.g., 'exploit outdated nodes on software container'). In an embodiment, where the output includes an attack statement, an action prompt is generated based on the attack statement and the data schema, which when executed by the LLM configures the LLM to generate an action instruction as an output.

In certain embodiments, the output is provided to a discriminator neural network, which is configured to determine if the attack action is a viable attack action. For example, in an embodiment, a discriminator is configured to initiate the attack action in a computing environment, determine an impact of the attack action, and provide an output to train a generator (such as the LLM) to generate a new attack action, based on the attack action and the impact of executing the attack action.

FIG. 6 is an example flowchart 600 of a method for utilizing a red team generative adversarial model in a cybersecurity range, implemented in accordance with an embodiment. In an embodiment, a cybersecurity range is utilized to train a defender to detect and prevent attacks.

For example, in an embodiment, a defender is a human operator tasked with cybersecurity protection of a computing environment. It is advantageous to simulate an attack on the computing environment in order to prepare the defender for a real attack. It is also advantageous, according to an embodiment, to simulate different attacks, as performing a repetitive drill is not conducive to developing a skill.

At S601, a cybersecurity range is deployed. In an embodiment, deploying a cybersecurity range is performed based on a data schema, including a network topology, a network hierarchy, a list of resources, a resource type, a list of principals, a principal type, a combination thereof, and the like.

In an embodiment, the cybersecurity range is deployed as a virtual environment in a cloud computing environment. For example, a virtual environment includes, according to an embodiment, a virtual private network (VPN), a virtual network (VNet), a virtual private cloud (VPC), a combination thereof, and the like. In some embodiment, the virtual environment is deployed on a cloud computing infrastructure, such as Amazon® Web Services (AWS), Microsoft® Azure, Google® Cloud Platform (GCP), and the like.

At S602, an attack scenario is generated. In an embodiment, the attack scenario is generated utilizing a first LLM. In some embodiments, the first LLM is configured to generate the attack scenario based on a data schema, a predefined attack scenario, various combinations thereof, and the like.

In an embodiment, generating an attack scenario includes modifying a predetermined prompt based on an input, such as a data schema, a previously generated attack scenario, an attack action, a combination thereof, and the like.

In certain embodiments, generating an attack scenario further includes providing an LLM with the prompt which when executed configures the LLM to generate an output, the output including an attack scenario, an attack action, and the like. For example, in an embodiment, an attack scenario includes steps for attacking a computing environment. In an embodiment, an attack scenario includes, for example, a series of steps.

As an example, according to an embodiment, a first step is "initiate network discovery", a second step is "attempt to access a discovered asset", a third step is "download a file from an accessed asset", etc.

At S603, an attack scenario is provided to a second LLM. In an embodiment, the attack scenario is the generated attack scenario of S602. In certain embodiments, the second LLM is configured to generate an attack action based on the generated attack scenario.

In some embodiments, the second LLM is the first LLM, configured to execute a different prompt. For example, the second LLM is configured to execute a different prompt, which is generated by modifying a second prompt based on an output of the first LLM.

In some embodiments, a first LLM includes a first context length, and a second LLM includes a second context length, which is different than the first context length. In certain embodiments, it is advantageous to generate an attack scenario utilizing an LLM having a longer context length than a second LLM, which is utilized to generate attack actions.

At S604, an attack action is initiated. In an embodiment, the attack action is initiated in the cybersecurity range based on the generated attack action of S603. In some embodiments, the attack action is initiated by an orchestrator, a virtual instance, a service account, a user account, a combination thereof, and the like.

In an embodiment, the attack action includes accessing a storage, removing a file, deleting a file, sending a file from the cybersecurity range to an external destination, removing a principal, adding a principal, changing permission of a principal, revoking permission from a principal, installing malware, installing a cryptomining server, a combination thereof, and the like.

Figure 7:
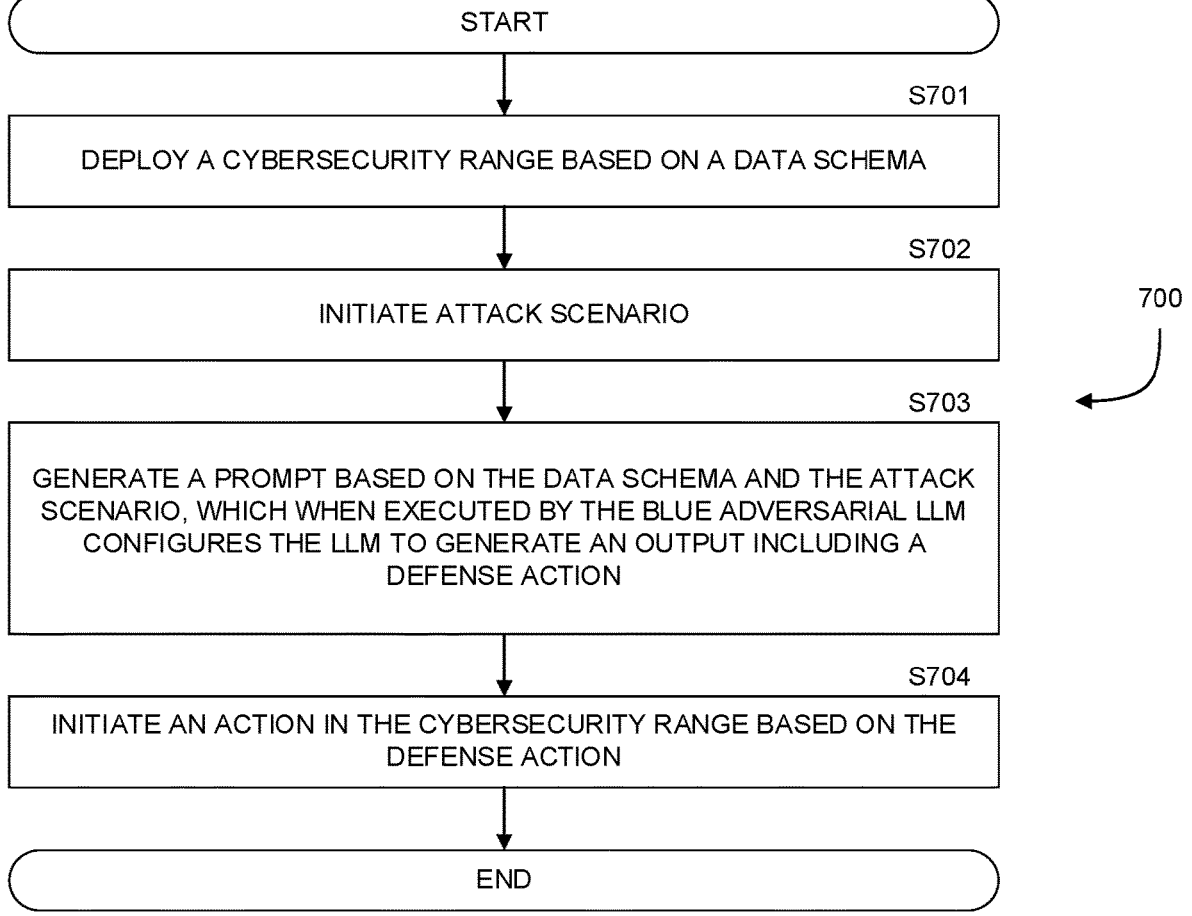
FIG. 7 is an example flowchart of a method for training a blue team generative adversarial model, implemented in accordance with an embodiment.

FIG. 7 is an example flowchart 700 of a method for training a blue team generative adversarial model, implemented in accordance with an embodiment. In an embodiment, a blue team generative adversarial model is utilized in protecting a computing environment, e.g., by detecting and thwarting cybersecurity attacks.

In some embodiments, it is useful to train a human in penetration testing, which involves attempting to gain access to a computing environment, a resource in a computing environment, a file, a combination thereof, and the like. In such an embodiment, it is advantageous to simulate a defender which would attempt to block the penetration testing.

At S701, a cybersecurity range is deployed. In an embodiment, deploying a cybersecurity range is performed based on a data schema, including a network topology, a network hierarchy, a list of resources, a resource type, a list of principals, a principal type, a combination thereof, and the like.

In an embodiment, the cybersecurity range is deployed as a virtual environment in a cloud computing environment. For example, a virtual environment includes, according to an embodiment, a virtual private network (VPN), a virtual network (VNet), a virtual private cloud (VPC), a combination thereof, and the like. In some embodiment, the virtual environment is deployed on a cloud computing infrastructure, such as Amazon® Web Services (AWS), Microsoft® Azure, Google® Cloud Platform (GCP), and the like.

At S702, an attack scenario is initiated. In an embodiment, an attack scenario is a generated attack scenario, for example generated by a red team LLM, such as described in more detail herein. In certain embodiments, an attack scenario includes a plurality of actions, a sequence of actions, and the like. In an embodiment, a sequence of actions is performed, initiated, etc., in a sequential manner, such that a first attack action is initiated prior to a second attack action. In some embodiments, a second attack action is only initiated based on an outcome of initiating the first attack action.

At S703, a prompt is generated based on the data schema and the attack scenario. In an embodiment, an attack scenario is detected by detecting an attack action. For example, in an embodiment, a system is configured to detect actions, events, and the like in computing environment, and determine that an action is an attack action, for example by matching the attack action to a list of predetermined attack actions.

In an embodiment, a prompt, when executed by a "blue team" generative LLM, will configure the LLM to generate an output including a defense action. According to an embodiment, a defense action includes an action, a series of actions, and the like, initiated in response to an attack action.

In some embodiments, a defense action includes any one or more of: decommissioning an asset, changing credentials (e.g., for accessing sensitive data stores), performing ad hoc encryption of data at rest to prevent exfiltration, tracing a location of an intruder via IP address backtracking, any combination thereof, and the like.

In an embodiment, a defense action corresponds to an attack actions performed by a "red team" adversarial LLM. For example, in an embodiment, an attack action specifically targeting a database within a cybersecurity range environment, when detected, will initiate a defense action intended to shield, mitigate, protect, and the like, the database.

At S704, a defense action is initiated. In an embodiment, the defense action is initiated in the cybersecurity range based on the defense action generated at S703. In some embodiments, a plurality of defense actions are initiated. In certain embodiments, a defense action is initiated for a set period of time. For example, according to an embodiment, a defense action when initiated causes blocking of network traffic to a resource in the cybersecurity range environment. In an embodiment, after a predetermined amount of time has passed, the defense action is revoked, which ceases blocking of network traffic to the resource.

According to some embodiments, a plurality of actions are generated, wherein each action is generated based on a unique principal. For example, in an embodiment, a first action is generated for a first principal, and a second action is generated for a second principal. This is advantageous in utilizing a first generative model in training of a second generative model, as in a real-world situation, an attack is perpetrated utilizing multiple different principals, each of which initiates an action in the computing environment. By configuring a plurality of principals to initiate actions, this provides an effective simulation of an attack which is utilized to train a defensive model, according to an embodiment.

In certain embodiments, the plurality of actions are defensive actions, and the trained generative model is a model configured to generate attack actions. This is advantageous, according to an embodiment, as a real-world defense includes multiple principals acting together to stop an attack, according to some embodiments.

Figure 8:
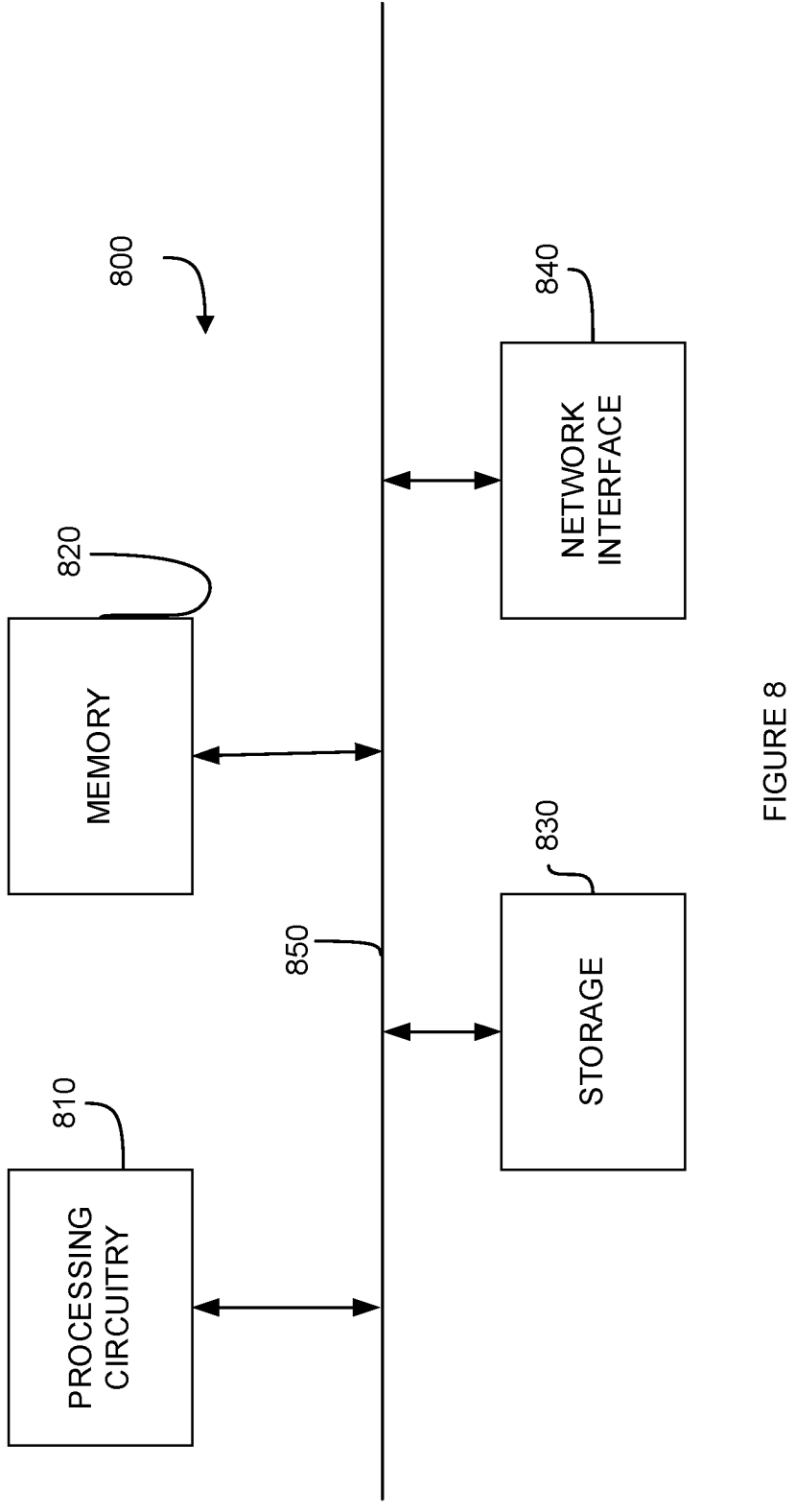
FIG. 8 is an example schematic diagram of a system according to an embodiment.

FIG. 8 is an example schematic diagram of a system 800 according to an embodiment. In an embodiment, the system 800 is configured to execute a blue team adversarial model, a red team adversarial model, a combination thereof, and the like. For example, in an embodiment, the system 800 is configured to execute a blue team LLM, a red team LLM, a combination thereof, and the like. In some embodiments, the system 800 is configured to detect actions in a cybersecurity range, such as actions indicating a cybersecurity attack.

The system 800 includes a processing circuitry 810 coupled to a memory 820, a storage 830, and a network interface 840. In an embodiment, the components of the system 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof. In an embodiment, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein may be stored in the storage 830, in the memory 820, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 840 is configured to provide the system 800 with communication with, for example, the cybersecurity range 100 of FIG. 1.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for utilizing a generative adversarial model for training in a cybersecurity range, comprising:
   generating a plurality of scenarios based on a plurality of predetermined actions in a cloud computing environment, wherein the scenario is an attack scenario that includes instructions for an execution of a plurality of actions in a cybersecurity range;
   initiating a cybersecurity range, the cybersecurity range including a secure cloud computing environment and a plurality of workloads deployed therein;
   generating a prompt for a large language model (LLM) based on a template, a scenario of the plurality of scenarios, and an identifier of a workload of the plurality of workloads; and
   initiating an action of the plurality of actions in the cybersecurity range based on an output generated by the LLM in response to the prompt, wherein the action includes an attack on a resource of the cybersecurity range.

2. The method of claim 1, further comprising:
   configuring a workload of the plurality of workloads with a vulnerability; and
   generating the prompt for the LLM further based on the vulnerability.

3. The method of claim 2, further comprising:
   exploiting the vulnerability of the workload.

4. The method of claim 1, further comprising:
   continuously generating prompts for the LLM; and
   continuously initiating actions in the cybersecurity range based on outputs generated by the LLM.

5. The method of claim 1, further comprising:
   generating a prompt for the LLM based on a template, wherein the prompt causes the LLM to output an action for the cloud computing environment.

6. The method of claim 1, further comprising:

generating the prompt further based on an identifier of a principal, wherein the principal is deployed in the secure cloud computing environment.

7. The method of claim 1, further comprising:

configuring a workload of the plurality of workloads with an exposure; and generating the prompt further based on the exposure.

8. The method of claim 7, further comprising:

generating a network access instruction based on the exposure.

9. The method of claim 7, wherein the exposure is between a first partition of the secure cloud computing environment and a second partition of the secure cloud computing environment.

10. A non-transitory computer-readable medium storing a set of instructions for utilizing a generative adversarial model for training in a cybersecurity range, the set of instructions comprising:

one or more instructions that, when executed by one or more processors of a device, cause the device to:

generate a plurality of scenarios based on a plurality of predetermined actions in a cloud computing environment, wherein the scenario is an attack scenario that includes instructions for an execution of a plurality of actions in a cybersecurity range;

initiate a cybersecurity range, the cybersecurity range including a secure cloud computing environment and a plurality of workloads deployed therein;

generate a prompt for a large language model (LLM) based on a template, a scenario of the plurality of scenarios, and an identifier of a workload of the plurality of workloads; and initiate an action in the cybersecurity range based on an output generated by the LLM in response to the prompt, wherein the action includes an attack on a resource of the cybersecurity range.

11. A system for utilizing a generative adversarial model for training in a cybersecurity range comprising:

a processing circuitry;

a memory, the memory containing instructions that, when executed by the processing circuitry, configure the system to:

generate a plurality of scenarios based on a plurality of predetermined actions in a cloud computing environment, wherein the scenario is an attack scenario that includes a plurality of instructions for an execution of a plurality of in a cybersecurity range;

initiate a cybersecurity range, the cybersecurity range including a secure cloud computing environment and a plurality of workloads deployed therein;

generate a prompt for a large language model (LLM) based on a template, a scenario of the plurality of scenarios, and an identifier of a workload of the plurality of workloads; and initiate an action in the cybersecurity range based on an output generated by the LLM in response to the prompt, wherein the action includes an attack on a resource of the cybersecurity range.

12. The system of claim 11, wherein the memory contains further instructions which when executed by the processing circuitry further configure the system to:

configure a workload of the plurality of workloads with a vulnerability; and generate the prompt for the LLM further based on the vulnerability.

13. The system of claim 12, wherein the memory contains further instructions which when executed by the processing circuitry further configure the system to:

exploit the vulnerability of the workload.

14. The system of claim 11, wherein the memory contains further instructions which when executed by the processing circuitry further configure the system to:

continuously generate prompts for the LLM; and continuously initiate actions in the cybersecurity range based on outputs generated by the LLM.

15. The system of claim 11, wherein the memory contains further instructions which when executed by the processing circuitry further configure the system to:

generate a prompt for the LLM based on a template, wherein the prompt causes the LLM to output an action for the cloud computing environment.

16. The system of claim 11, wherein the memory contains further instructions which when executed by the processing circuitry further configure the system to:

generate the prompt further based on an identifier of a principal, wherein the principal is deployed in the secure cloud computing environment.

17. The system of claim 11, wherein the memory contains further instructions which when executed by the processing circuitry further configure the system to:

configure a workload of the plurality of workloads with an exposure; and generate the prompt further based on the exposure.

18. The system of claim 17, wherein the memory contains further instructions which when executed by the processing circuitry further configure the system to:

generate a network access instruction based on the exposure.

19. The system of claim 17, wherein the exposure is between a first partition of the secure cloud computing environment and a second partition of the secure cloud computing environment.

* * * * *